United States Patent

Aruga et al.

[11] Patent Number: 6,005,644
[45] Date of Patent: Dec. 21, 1999

[54] PROJECTION DISPLAY EMPLOYING CIRCULAR POLARIZED LIGHT FOR REFLECTION REDUCTION

[75] Inventors: Shuji Aruga; Hirosada Horiguchi, both of Suwa, Japan

[73] Assignee: Seiko Epson Corporation, Tokyo, Japan

[21] Appl. No.: 08/610,910

[22] Filed: Mar. 5, 1996

[30] Foreign Application Priority Data

Mar. 8, 1995 [JP] Japan .................................. 7-048749

[51] Int. Cl.$^6$ .......................... G02F 1/1335; G02B 27/00
[52] U.S. Cl. .................................. 349/5; 349/8; 349/98; 359/601; 359/634
[58] Field of Search ................................ 349/56, 98, 102, 349/5, 8, 9, 137, 119, 121; 359/601, 634, 609

[56] References Cited

U.S. PATENT DOCUMENTS

| | | | |
|---|---|---|---|
| 5,576,854 | 11/1996 | Schmidt et al. | 349/5 |
| 5,585,946 | 12/1996 | Chern | 349/5 |

FOREIGN PATENT DOCUMENTS

| | | |
|---|---|---|
| 0 295 913 | 12/1988 | European Pat. Off. . |
| 3-089316 | 4/1991 | Japan . |
| 4-119323 | 4/1992 | Japan . |
| 4-151193 | 5/1992 | Japan . |
| 5-210097 | 8/1993 | Japan . |
| 6-110055 | 4/1994 | Japan . |

Primary Examiner—William L. Sikes
Assistant Examiner—Kenneth Parker
Attorney, Agent, or Firm—Michael T. Gabrik

[57] ABSTRACT

A projection display for preventing reflected light beams produced during optical modulation or light compositing from reinjecting into the modulating liquid crystal panel, as well as to convert projected light or light impinged into a light compositing system into a linearly polarized light beam, thereby projecting high-contrast, high-intensity images with minimal reflection errors. This display will preferably include a light source, an optical modulation system for modulating the light beam emitted from the light source according to a video signal using a liquid crystal panel having a polarizing plate or filter on the output surface thereof, a first phase plate provided on the output side of the polarizing plate for converting the linearly polarized light beam that has passed through the optical modulation system into a circularly polarized light beam, a second phase plate provided on the output side of the first phase plate for converting the circularly polarized light beam that has passed through the first phase plate into a linearly polarized light beam, and an optical projector system for projecting on a screen in enlarged fashion the resultant linearly polarized light beam that has passed through the second phase plate. The first and second phase plates are preferably disposed such that reflected light produced at interfaces between air and the first or second phase plates, or a light compositor are polarized at right angles to the light transmission axis of the interposing polarizing plate, thereby blocking their passage back to the liquid crystal panel.

18 Claims, 7 Drawing Sheets

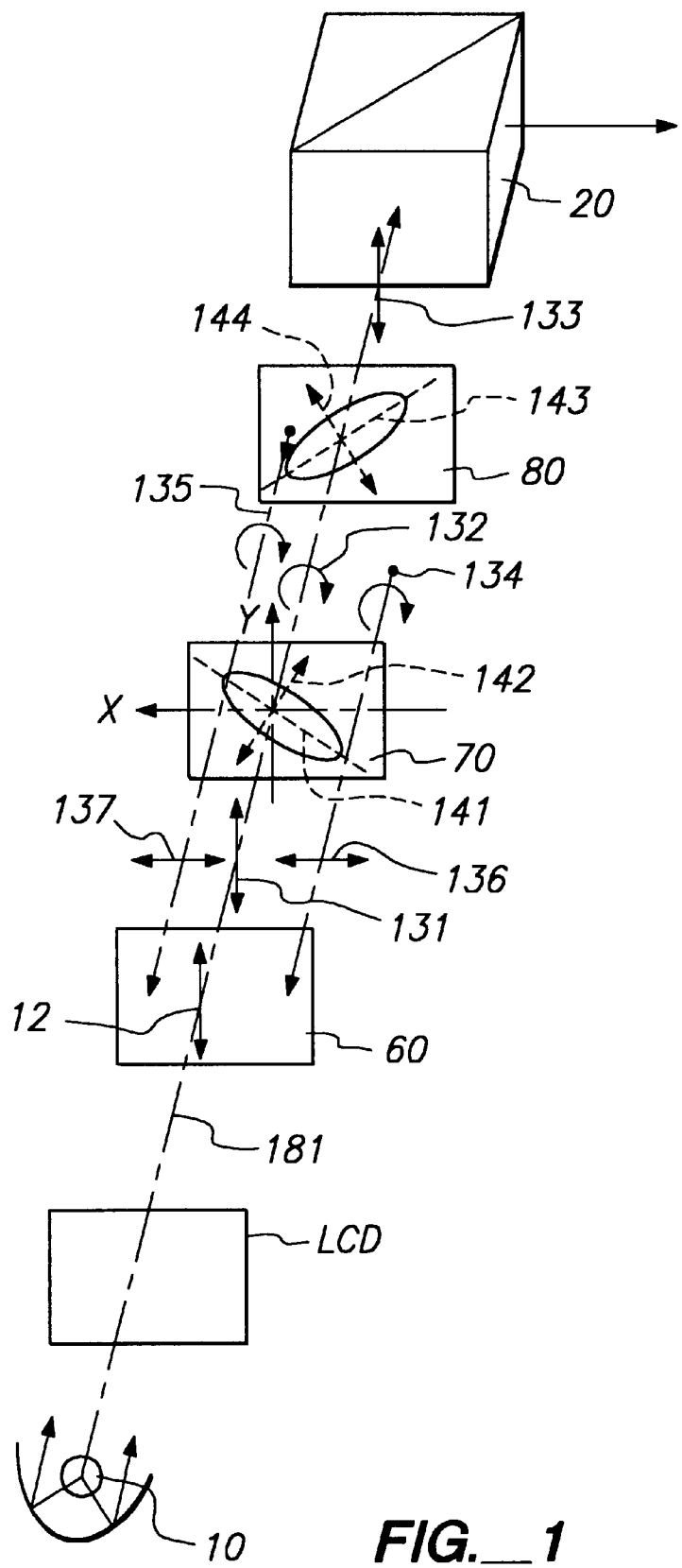
FIG._1

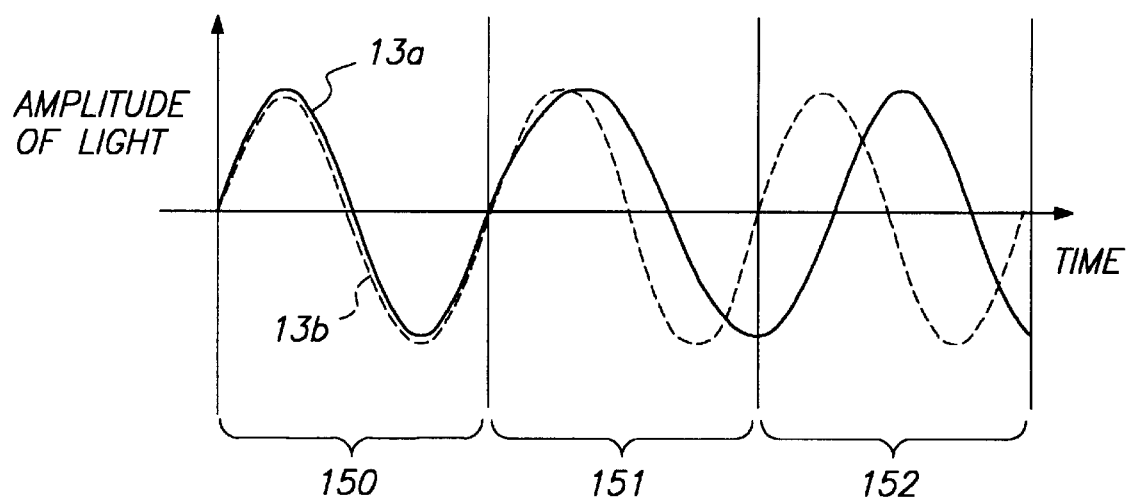
FIG._2A
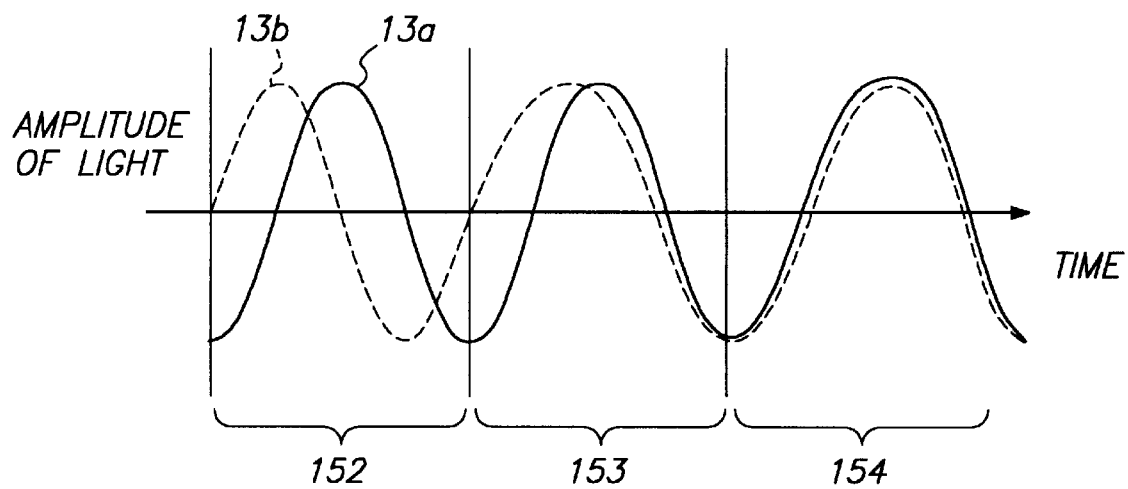
FIG._2B

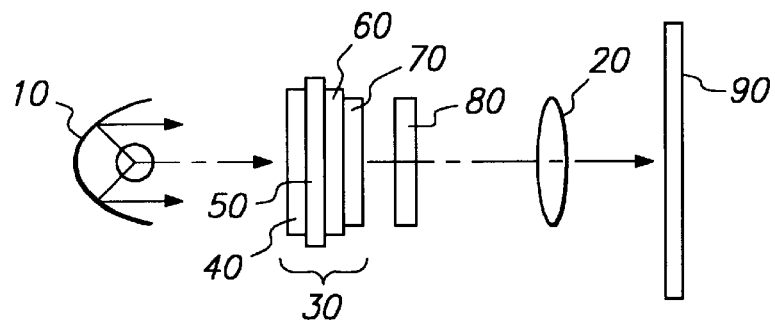
FIG._3
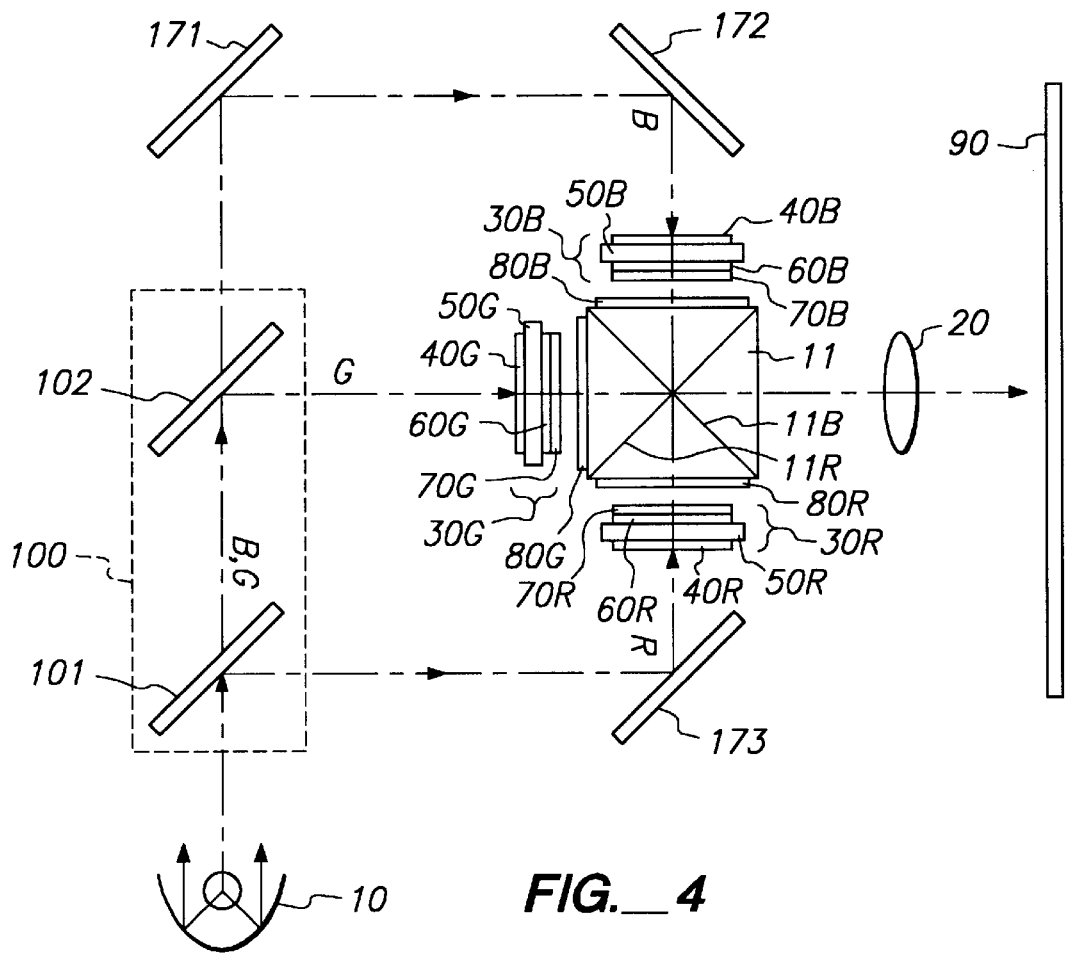
FIG._4

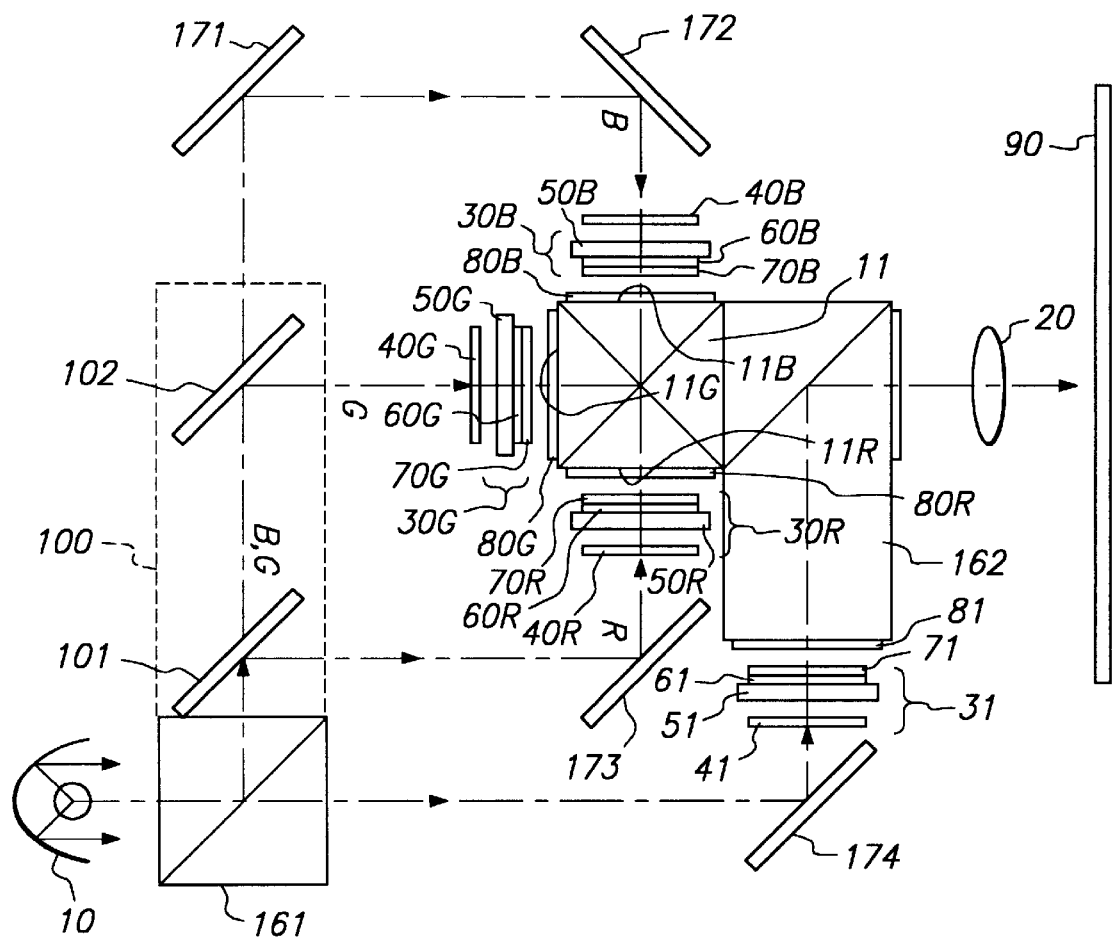
FIG._5

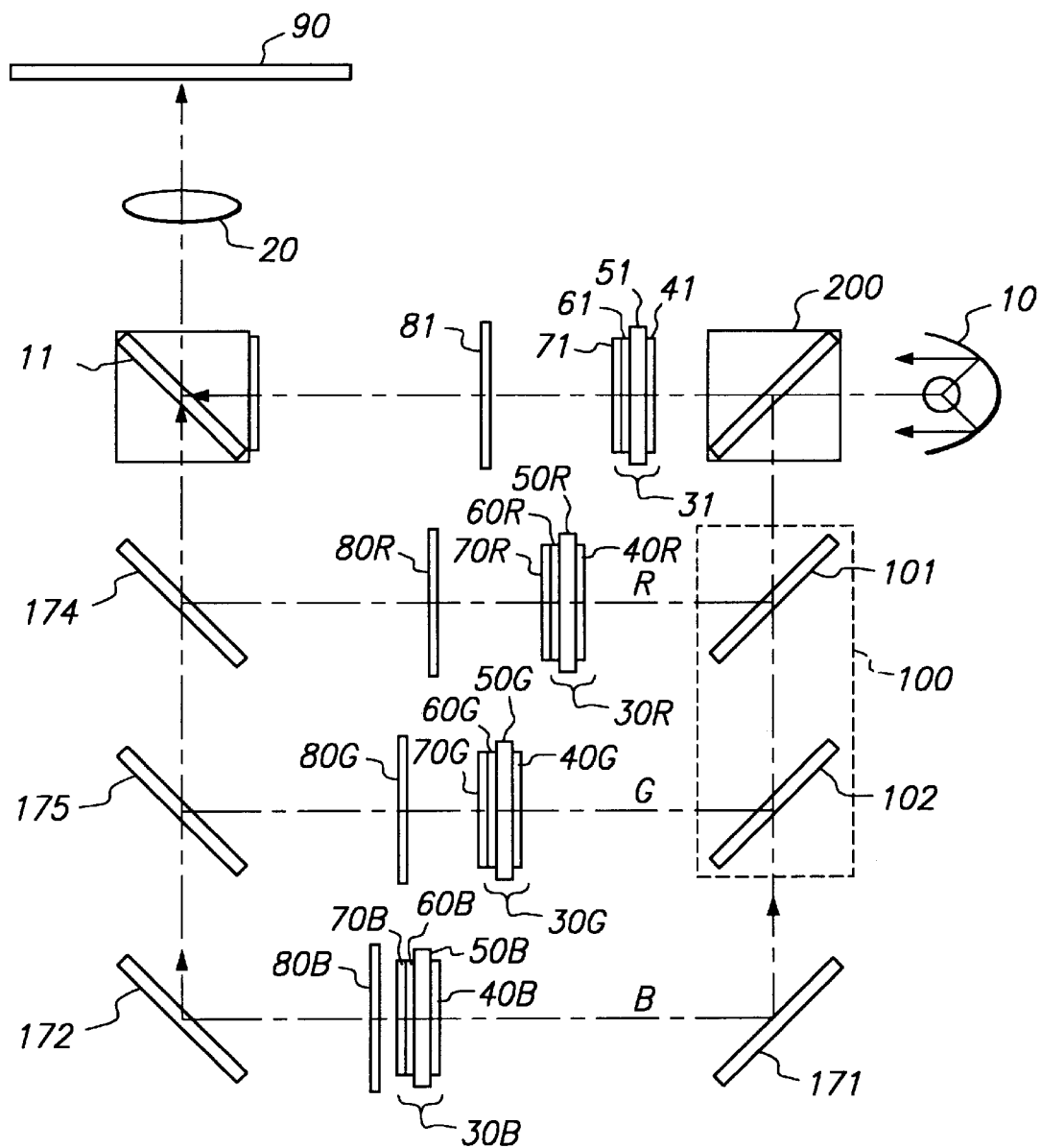
FIG._6

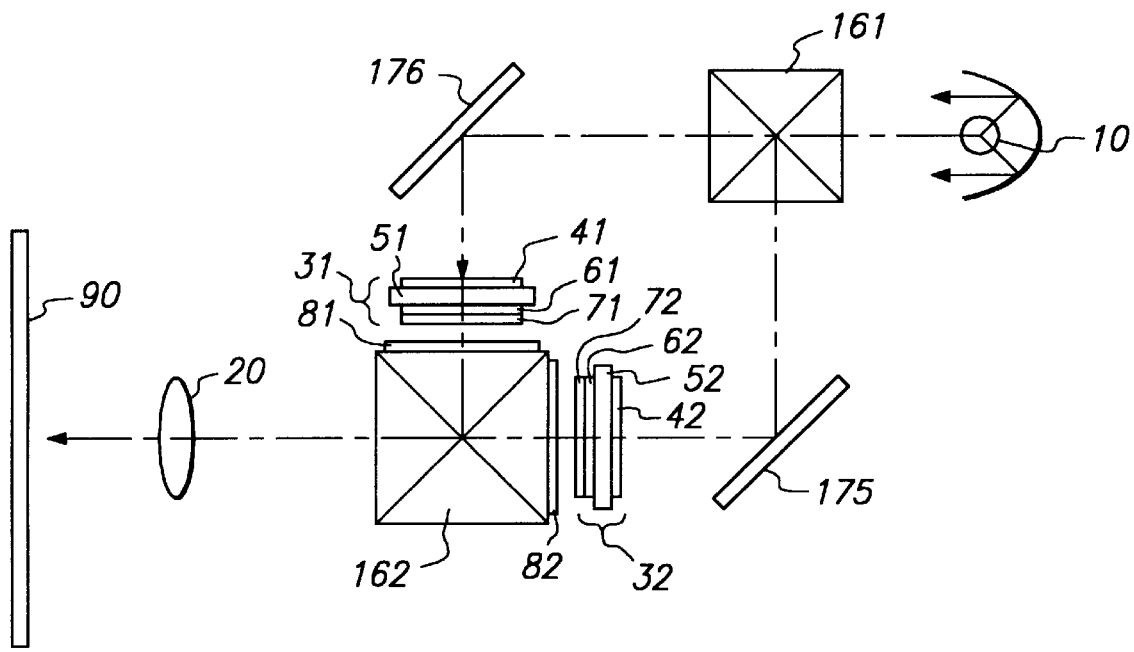
FIG._7
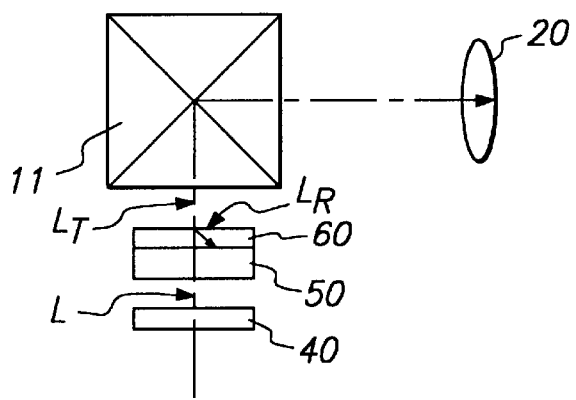
FIG._8 PRIOR ART

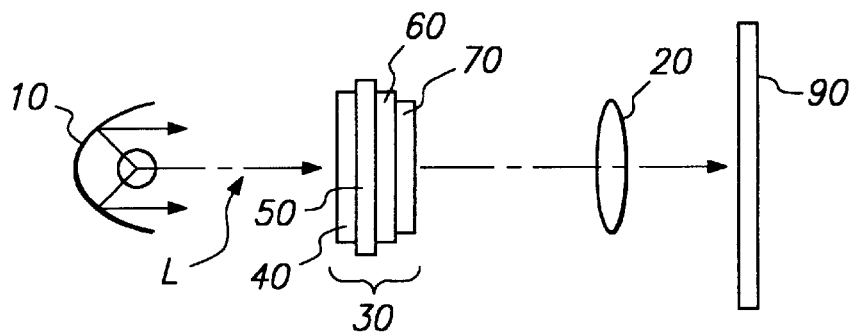
FIG._9A PRIOR ART
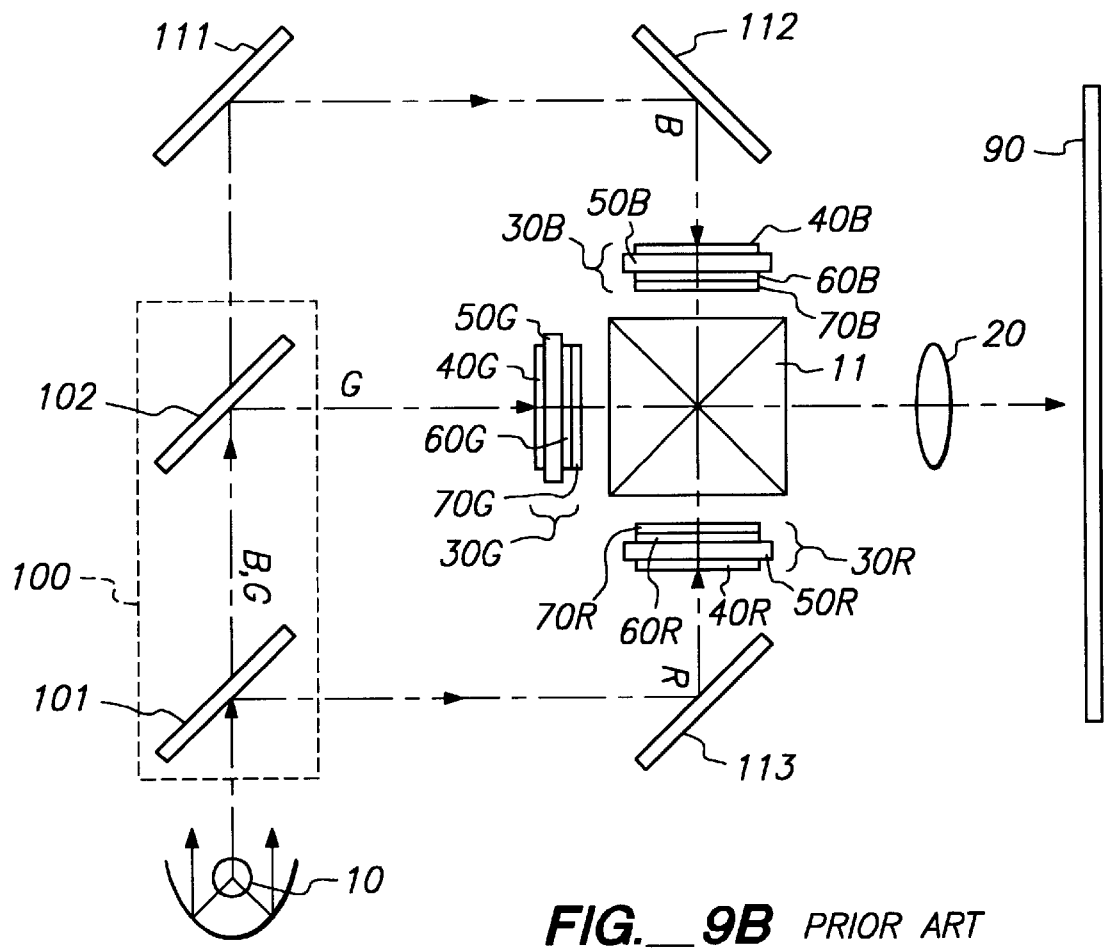
FIG._9B PRIOR ART

PROJECTION DISPLAY EMPLOYING CIRCULAR POLARIZED LIGHT FOR REFLECTION REDUCTION

BACKGROUND OF THE INVENTION

1. Field of the Invention

This invention relates generally to a projector-type display device comprising a liquid crystal panel as light valve in which the light beam is modulated according to a video signal, and a lens through which the light beam passes and is projected on a screen in enlarged fashion. More specifically, this invention relates to a projector-type display device which prevents the light beam passing through the liquid crystal panel from reflecting off the lens or optical composite prism and back into the liquid crystal panel.

2. Description of the Related Art

Today, research in practical usage of a projector-type display device is underway, wherein a light beam from a light source is modulated according to a video signal as it passes through a translucent LCD panel and projected on a screen in enlarged fashion through a optical projector system. However, significant glare and optical feedback problems remain, as shown in the conventional projection display of FIG. 8. As shown in this figure, the portion of the light beam L which is reflected in the interface between a polarizing plate 6 and air ($L_R$ in FIG. 8) returns back to the liquid crystal panel to cause display and image washout errors. It is necessary to solve this problem as soon as possible, and a projector-type display device which has a λ/4 plate between the liquid crystal panel and the optical projector system is described in the Japanese Laid-open Patent Publication Hei 5-210097, as a known technique to reduce transmission of $L_R$ back to the LCD panel.

FIG. 9A shows the optical system of a conventional projector-type display device utilizing the aforementioned λ/4 polarizing plate. In FIG. 9A, the light beam emitted L from the light source lamp 10 passes through an optical modulating system 30, comprising an input-side polarizing plate 40, a liquid crystal panel 50, and an output-side polarizing plate 60. In the optical modulating system 30, the light beam impinged according to the video signal is modulated in the liquid crystal panel 50, then modulated again by passing through the output side polarizing plate 60 to form a linearly polarized light beam, and impinged into the λ/4 plate 70 which is disposed in the manner that the direction of its slow axis is off-aligned by 45° with that of the light transmission axis of the output-side polarizing plate 60. Then, the light beam which passed the λ/4 plate 70 is projected on the screen 90 in enlarged fashion by the optical projector system 20.

On the other hand, the light beam which is reflected by the interface between output side of λ/4 plate and air passes through the λ/4 plate 70 again from the opposite side to result in a linearly polarized light beam whose polarizing direction is off-aligned by 90° with that of the light transmission axis of the output-side polarizing plate 60. Therefore, the light beam which is reflected by the optical projector system 20 is absorbed by the output-side polarizing plate 60, not returning back to the liquid crystal panel.

FIG. 9B shows a configuration of optical system of a conventional projectortype display device wherein three (3) liquid crystal panels are applied. In FIG. 9B, the light beam emitted from the light source lamp 1 is separated into the light beams of red, green, and blue by means of a color separator system 100 which includes dichroic mirrors 101, 102. Then, the light beams separated by the color separator system 100 are impinged into the optical modulation system 30R, 30G, and 30B, which are respectively equipped with three (3) liquid crystal panels 50R, 50G, and 50B that correspond with the colors red, green, and blue as conducted by mirrors 111, 112, and 113. In each optical modulation system 30R, 30G, and 30B, the light beams of each color which is impinged according to the video signal are modulated by each liquid crystal panels 50R, 50G, and 50B, then modulated again by passing through the output-side polarizing plate 60R, 60G, and 60B to form linearly polarized light beams of the respective wavelengths. These linearly polarized light beams are then impinged into respective λ/4 plates 70R, 70G, and 70B, each disposed in the manner such that the direction of its slow axis is off-aligned 45° with that of the light transmission axis of the output-side polarizing plate. Then the light beams which pass through the λ/4 plate 70R, 70G, and 70B are compounded by the light composite system 11 and are projected on the screen 90 in enlarged fashion by the optical projector system 20. On the other hand, the light beams which are reflected by the interface between output side of λ/4 plates 70R, 70G, 70B and air pass through the λ/4 plate 70R, 70G, and 70B again from the opposite side to result in the linearly polarized light beam whose polarizing direction is off-aligned by 90° with that of the light transmission axis of the output-side polarizing plate 60R, 60G, and 60B. Therefore, the light beams which are reflected by the interface between output side of λ/4 plate 70R, 70G, and 70B and air are absorbed by the output-side polarizing plate 60R, 60G and 60B and do not return or reflect back to the liquid crystal panel.

With regard to these projector-type display devices, the light beams which pass through the optical modulation system 30R, 30G, and 30B (i.e. the light beams which are projected on the screen 90 in enlarged fashion), are modulated therein to form circularly polarized light beams because they must additionally pass through the λ/4 plate 70R, 70G or 70B prior to composition and projection. However, it is preferable that the light beam projected on the screen or the light impinged into the light composite system 11 is linearly polarized, as will be discussed hereinbelow.

Consider the case in which the light beam impinged in the light composite system is circularly polarized, as is described in connection with the conventional projection display devices illustrated in FIGS. 9A and 9B. Generally a dichroic prism having wave length selectivity is used for the light compositor system 11, and usually the dichroic prism specifies a wave length selectivity for exclusively either an S or a P-polarized component as is known in the art. This stems from the fact that while it is theoretically feasible to construct a dual selectivity dichroic prism, it is commercially impractical to produce such a device for the consumer projection market. Therefore, if the light composite system 11 described hereinabove is optimized for S-polarization selectivity, the S-polarized component of a red light beam emitted from the optical modulation system 30R, the light beam is reflected in the appropriate red reflecting film (not shown) of the light compositor 12 and conducted to the optical projector system 20. However, for the P-polarized component of the red light, a part of it passes through the red reflecting film. As a result, the red light beam is impinged into the optical modulation system 30B which opposes the optical modulation system 30R with the light composite system 11 interposing therebetween, resulting in perceptible glare, washout or partial disruption of the blue light beam. Moreover, similar problems exist when considering the P components produced by optical modulation systems 30G and 30R, or when the dichroic prism is optimized for P component selectivity.

Moreover, as ambient lighting normally projects from a ceiling-mounted device, reflected light of P-polarized direction tends to be more noticeable compared with that of the S-polarized direction. Therefore, a polarization screen fitted to the projection device which absorbs the P-polarized light component would normally be employed. However, if the light beam projected on the screen is circularly polarized, this-polarization screen would filter out P-polarized ambient light and the P-polarized component of the projected light beam. Thus, the intensity of the light beam projected on the screen would be cut in half and overall brightness of the projected image be diminished. Therefore, it would preferable that the light beam projected on the screen or the light impinged into the light composite system is linearly polarized so that only the P-polarized ambient light be filtered out by this polarization screen.

OBJECTS OF THE INVENTION

It is, therefore, an object of the present invention to provide a projection display and method which prevents reinjection of reflected light originating at the boundaries between air and a polarizing filter or λ/4 plate back into the liquid crystal panel thereby enhancing display characteristics and preventing undesirable image alteration or display errors.

It is a further object of the present invention to provide a projection display and method which minimize such reflection errors while generating a linearly polarized composite light beam of high intensity and brightness, even where a P-polarization screen is used in conjunction with the projection display device to filter out ambient ceiling light.

SUMMARY OF THE INVENTION

In accordance with these and related objections, a projection display according to the present invention will preferably comprise: 1) a light source; 2) an optical modulation system for modulating the light beam emitted from the light source according to a video signal using a liquid crystal panel having a polarizing plate or filter on the output surface thereof; 3) a first phase plate provided on the output side of the polarizing plate for converting the linearly polarized light beam that has passed through the optical modulation system into a circularly polarized light beam; 4) a second phase plate provided on the output side of the first phase plate for converting the circularly polarized light beam that has passed through the first phase plate into a linearly polarized light beam; and 5) an optical projector system for projecting on a screen in enlarged fashion the resultant linearly polarized light beam that has passed through the second phase plate.

Furthermore, according to the first embodiment, these first and second plates may each comprise a λ/4 plate in which the slow axis of the first phase plate is off-aligned 45° with respect to the light transmission axis of the polarizing plate or filter. Further, in this case, the slow axis of the second phase plate may be off-aligned 90° with respect to the light transmission axis of the polarizing plate or filter such that the light beam projected on the screen is linearly polarized.

Alternatively, the projection display according to the second embodiment of the present invention may comprise: 1) a light source which emits a light beam containing a light beams of the three primary colors (red, green and blue); 2) a color separator system which converts the light beam emitted from the light source into the light beam of three primary colors; 3) an optical modulation system for modulating each of the converted light beams according to a video signal using a liquid crystal panel having a polarizing plate on the output surface thereof; 4) a first phase plate provided on the output side of the polarizing plate for converting the linearly polarized light beams which have passed through the optical modulation system into corresponding circularly polarized light beams; 4) a second phase plate provided on the output side of the first phase plate for converting the circularly polarized light beams which have passed through the first phase plate into a linearly polarized light beam; 5) an optical composite system for compounding the light beams of each color that have passed through the second phase plate; and 6) an optical projector system for projecting on a screen in enlarged fashion the light beam compounded by the color optical compounding system. This configuration is especially useful in color projection applications.

Further, according to the second embodiment, the first phase plate may be disposed in the output side of multiple polarizing plates for modulating the three primary colors with separate optical modulation systems, and the second phase plate may be disposed on the output side of this first phase plate.

Further, according to this embodiment, the optical modulating system and the first and the second phase plates may be disposed such that the polarizing direction of the light beams of each color which are injected into the optical composite system is the same. To this end, using a dichroic prism for the color compositor which has a wavelength selectivity appropriate to its polarizing direction can prevent the wavelength selectivity of dichroic prism from deteriorating based on the polarizing direction of the light beam. Further, the preferred polarizing direction for the dichroic prism is the S-polarizing direction, because an S-polarized dichroic prism can be obtained more easily and at lower cost than a P-polarized prism.

Moreover, the first phase plate may be made most suitable for filtering out blue color light. Reflection errors can be minimized using first and second phase plates optimized for filtering out blue light, because wavelength of light beams most susceptible to reflection in projection displays falls within the shorter (blue-hued) wavelengths of the visible spectrum. Moreover, the blue wavelength light accounts for the majority of display errors, since the thin film poly-Si transistors comprising the LCD modulation panel tend to disproportionately absorb blue light and are especially prone to performance characteristic alteration by the absorbed blue light in comparison with light of other visible wavelengths. Therefore, by using phase plates made most suitable for blue color light beam, it can be possible to essentially prevent image-damaging light beams from being impinged into the liquid crystal panel and prevent noticeable TFT and display reflection errors. Further, in this case an inexpensive device can be obtained because only one type of the phase plates is required. Also, when a plurality of optical modulating systems for each primary color are utilized, the first and second phase plate may need only be disposed on the output side of the polarizing plates equipped in the optical modulating system for modulating the blue light beam in order to provide good protection against reflection errors at an even more modest design and manufacturing cost.

Alternatively, according to the second embodiment of the present invention, separate first and second phase plates may be incorporated into a plurality of optical modulating systems for each primary color. Each pair would then be optimized for filtering out reflected light of a particular hue or wavelength dependent on the color light beam injected into the respective optical modulating system. In this embodiment, the first and second phase plates used for each of the red, green, and blue light beams would consequently be different, and a more expensive and complicated projection system would hence be required. However, selecting the first and second phase plates in such a manner can minimize the intensity of all types of reflected light beam returning to the liquid crystal panel.

Also, in this embodiment, it is preferable that the first phase plate, the polarizing plate, the second phase plate and the optical compositor are optically stuck or adhered together, to minimize light reflection at plate-air interfaces.

A projector-type display according to the third or fourth embodiments of the present invention may comprise: 1) a light source; 2) an optical separator system for separating a white light beam emitted from the light source into a P-polarized light beam and an S-polarized light beam; 3) a color separator system for separating either the P-polarized light beam or the S-polarized light beam into the three primary color beams; 4) a brilliance optical modulation system for modulating the remaining S or P-polarized light beam according to a brilliance signal using a brilliance liquid crystal panel having a polarizing plate on the output surface thereof; 5) a chrominance optical modulation system for modulating each light beam separated by the color separation system according to received chrominance signals using a color liquid crystal panel having a polarizing plate on the output surface thereof; 6) a first phase plate provided on the output side of each polarizing plate for converting the linearly polarized light beams that have passed through either optical modulation system into corresponding circularly polarized light beams; 7) a second phase plate provided on the output side of each first phase plate for converting the circularly polarized light beam that has passed through the corresponding first phase plate into a linearly polarized light beam; 8) a color composite system for compounding the color light beams that have passed through the second phase plates; and 9) an optical projector system for projecting on a screen in enlarged fashion the modulated light beam composited by the color composite system.

Other objects and attainments together with a fuller understanding of the invention will become apparent and appreciated by referring to the following description of specific preferred embodiments and the appending claims, taken in conjunction with the accompanying drawings.

BRIEF DESCRIPTION OF THE DRAWINGS

In the drawings wherein like reference symbols refer to like parts:

FIG. 1 illustrates overall optical operation according to the present invention;

FIGS. 2A and 2B diagrammatically show the phase transformations of the nonreflected light beam at each slow and fast axis depicted in FIG. 1;

FIG. 3 shows a projection-type display device according to the first embodiment which uses one liquid crystal panel;

FIG. 4 shows a projection-type display device according to the second embodiment which uses three liquid crystal panels;

FIGS. 5 and 6 show a projection-type display device according to the third embodiment which uses four liquid crystal panels;

FIG. 7 shows a projection-type display device according to the fourth embodiment which uses two liquid crystal panels;

FIG. 8 shows a refracted light beam of conventional projection-type display device;

FIG. 9A shows a conventional projection-type display device using one liquid crystal panel; and FIG. 9B shows a conventional projection-type display device using three liquid crystal panels.

DESCRIPTION OF THE PREFERRED EMBODIMENTS

Reference is now made to FIGS. 1, 2A and 2B in which the overall operation of the present invention is described. The light beam 181 is emitted from the light source 10 and then linearly polarized when passing through the polarizing plate 60 whose light transmission axis is vertical direction, and the polarizing direction of resultant light beam 131 is approximately vertical. Next, the linearly polarized light beam 131 passes through the first phase plate 70, which preferably comprises a $\lambda/4$ plate and is disposed in the manner that the direction of its slow axis 141 is off-aligned 45° relative to the light transmission axis. In so doing, a wave length phase separator of the light beam 131 component whose direction is toward the slow axis 141 of the first phase plate 70 is delayed by ¼ compared with that of the light beam 131 component whose direction is toward the fast axis 142 of the first phase plate 70, resulting in circularly polarized light beam. As used herein, a slow axis means the direction of a phase plate having high refractive index, and a fast axis means a direction of the phase plate having low refractive index and which is perpendicular with the slow axis.

FIG. 2A shows changes of phases of each components during this period. The vertical axis shows an amplitude of a light beam and the horizontal axis shows time. The solid line 13a shows a phase of the light beam component whose direction corresponds to slow axis 141 of the first phase plate 70 and the broken line 13b shows a phase of the light beam component whose direction is toward the fast axis 142 of the first phase plate 70. Time period 150 refers to the time interval or duration in which the light beam 131 passes from the optical polarizing plate 60 to the first phase plate 70. Time period 151 refers to the time interval or duration during which the light beam 131 passes through the first phase plates 70, and time period 152 refers the time interval or duration during which the resultant light beam 132 passes from the first phase plates 70 to the second phase plates 80.

Next, the light beam 132 (which has been modulated into a circularly polarized light beam by passing through the first phase plates 70) passes through the second phase plate 80. Second phase plate 80 is also preferably a $\lambda/4$ plate, and is disposed such that the direction of its slow axis 143 is off-aligned 90° relative to the light transmission axis 141 of the first phase plates 70. In so doing, a wave length phase separator of the light beam 132 component whose direction is toward the slow axis 143 of the second phase plates 80 (i.e. component 13b whose direction is toward the fast axis 142 of the first phase plates 70) is delayed by ¼ phase compared with that of the light beam 132 component whose direction is toward the fast axis 144 of the second phase plates 8 (i.e. the component 13a whose direction is toward the slow axis 141 of the first phase plates 70), resulting in linearly polarized light beam 133 being emitted from second phase plate 80. Note here that the polarizing direction of light beam 133 is roughly vertical, and is in fact in the same direction as the light beam 131 that passed through the optical polarizing plate 60.

FIG. 2B shows changes of phases of the components of light beam 132. As in FIG. 2A, the vertical axis shows an amplitude of a light beam and the horizontal axis shows time. The solid line 13a shows a phase of the light beam 132 component whose direction is toward the fast axis 144 of the second phase plates 80 and the broken line 13b shows a phase of the light beam 132 component whose direction is toward the slow axis 143 of the second phase plates 80. As in FIG. 2A above, time period 152 shows the time interval or duration during which the light beam 132 passes from the first phase plate 70 to the second phase plate 80, time period 153 shows the time interval or duration during which the light beam 132 passes through the second phase plate 80, and time period 154 shows the time interval or duration during which the resulting light beam 133 passes from the second phase plate 80 to the optical projector system 20.

Next, the light reflected by interfaces between output side of the first phase plate and input side of the second phase plate and air are considered. The light beam 134, 135 reflected by interfaces between output side of the first phase plate 70 or the input side of the second phase plate 80 and air return through the first phase plate 70. Then, the respective resulting light beams 137 and 136 are absorbed by the polarizing plate 60 and do not return back to the liquid crystal panel, because, by passing through the polarizing plate 60, they are converted into linearly polarized light beams whose optical polarizing axis meets at right angles with the light transmission axis of the polarizing plate and are thus blocked.

It should be recognized here that the first and second phase plates applied herein are not limited to λ/4 plates, and any other materials can reduce the injection of the reflected light into the liquid crystal panel so long as it can relatively slide either of the components of the light beam. Also, a configuration in which the polarizing plate 60 and the first phase plate 70 are optically stuck together or adhered can prevent a reflected light from coming into the liquid crystal panel, because there is no intervening air space to induce light beam reflections. Accordingly, as described hereinabove, light beams reflected by introduction of the phase plates and the optical projector system 20 can be prevented from entering into the liquid crystal panel. Moreover, since the light beam 133 projected on the screen from the optical projector system 20 is linearly polarized, a polarization screen can be employed to reduce glare from ambient lighting and improve image presentability, brightness and contrast. Further, if the light beam projected on the screen from the optical projector system is S-polarized and the polarization screen which absorb a light of P-polarized direction is employed, ceiling-emitted ambient of P-polarized direction can be absorbed, resulting in even higher ambient light absorption rates and increases image contrast and brightness over known systems.

FIG. 3 shows the optical system of the projector-type display device having a single light valve, according to the first embodiment of the invention. Here, the optical modulating system 30, is disposed to intercept a light beam emanating from the light source 10, which, in this embodiment, is a metal halide lamp. The optical modulating system 30 comprises a liquid crystal panel 5 disposed between or interposing the polarizing panels 40 and 60, and the polarizing panel 60 is disposed in the manner in that the direction of its light transmission axis is same as that of an S-polarized light beam. The first phase plate 70 is disposed in an optically stuck fashion to the polarizing plate 60 along the output side thereof, and the second phase plate 80 is disposed in the output side of the first phase plate 70.

A single-axis ductile film forming the λ/4 filter is applied to the first phase plate 70 and the second phase plate 80 to create λ/4 plate. Similar to the configuration of FIG. 1 described hereinabove, the first phase plate 70 is disposed in a manner such that the direction of its slow axis is off-aligned 45° with that of the light transmission axis of the polarizing plate 60, and the second phase plate 80 is disposed such that the direction of its slow axis is off-aligned 90° with respect to the first phase plate 70. The optical projector system 20 is disposed in the output side of the second phase plate 80 to selectively project the resultant light beam onto screen 90.

FIG. 4 shows a optical system of the projector-type display device according to the second embodiment incorporating three LCD modulating panels 50R, 50G, and 50B. The light beam emitted from the light source 10 (e.g. a metal halide lamp) is converted into the three primary colors red, green, and blue by means of the color separator system 100. The color separator system 100 includes dichroic mirrors 101 and 102. Dichroic mirror 101 is designed in a known manner to reflect red light while letting blue and green light pass through as light source 10 directs light beam energy towards it. Next, Dichroic mirror 102 is used to reflect green light present in the light beam directly to optical modulator 30G while letting blue light pass largely undisturbed. Mirrors 171, 172, and 173 are disposed from the color separator system 100 to guide the separated red or blue light into the appropriate optical modulating system 30R or 30B, as is well-known in the art.

As depicted in FIG. 4, the optical modulating systems 30R, 30G, and 30B respectively comprise first polarizing plates 40R, 40G, and 40B, LCD modulating panels 50R, 50G, and 50B, and second polarizing plates 60R, 60B, and 60G. The color-separated light beams are injected by color separator system 100 into its corresponding optical modulating system 30R, 30G, or 30B. Specifically, each color-separated light beam is conventionally polarized by first polarizing filter 40R, 40G, or 40G, and modulated in the liquid crystal panels 50R, 50G, or 50B, according to received video signals. After that, these separated light beams pass through the polarizing panel 60R, 60G, and 60B, and are emitted as the linearly polarized or S-polarized light beams as described hereinabove.

The polarizing plates 60R, 60G, and 60B are disposed such that the direction of their light transmission axis is same as that of S-polarized light beams. Thereafter, the S or linearly-polarized, color-separated light beams are impinged into their respective first phase plates 70R, 70G and 7B, which are preferably disposed optically stuck or adhered to the output side of corresponding polarizing plate 60R, 60G, or 60B. A single-axis ductile film having λ/4 optical characteristics is applied to make the first phase plates 70R, 70G, and 70B, and is disposed in the manner that the direction of their respective slow axes are off-aligned by 45° with respect to the light transmission axis of the second polarizing plate 60R, 60G, or 60B. The color-separated, linearly polarized light beams impinged into the first phase plates 70R, 70G and 70B are consequently converted into circularly polarized light beams by the reaction of the first phase plates 70R, 70G and 70B. The circularly polarized, color-separated light beams are then emitted toward the second phase plates 80R, 80G, and 80B.

The second phase plates 80R, 80G, and 80B are respectively disposed from output side of the first phase plates 70R, 70G, and 70B. A single-axis ductile film having λ/4 optical characteristics is applied to create the second phase plates 80R, 80G, and 80B (as well as the first phase plates), and are disposed such that the direction of their respective slow axes are off-aligned by 90° with respect to the light transmission axes of the corresponding first phase plates.

Once the circularly polarized, color separated light beams pass through the second phase plates 80R, 80G and 80B, they are converted into linearly polarized light beams as discussed previously and then are emitted toward and impinged into the light composite system 11.

The optical composite system 11 comprising a dichroic prism is disposed in the output side of the second phase plates 80R, 80G, and 80B, and the optical projector system 20 is disposed from the output side thereof. It is popular for a dichroic prism to be used for the light composite system 11. However, generally it is difficult to produce a dichroic prism so that it has both S and P wave length selectivity. Therefore, usually the dichroic prism is made to have a wavelength optimized for either the S or the P-polarized component of the color-separated light beams. As a result, the light beams injected into the light composite system 11 is linearly polarized and the dichroic prism 11 has the wave length selectivity for a light beam whose direction is same as the linearly polarized light beam, so that, for example, a blue light beam is prevented from passing through the blue reflecting film 11B.

On the other hand, light reflected by interfaces between output side of the first phase plate 70R, 70G and 70B or input side of the second phase plate 80R, 80G and 80B and air returns through the output side of first phase plate 70R, 70G and 70B. Then, these reflected light beams are absorbed by the polarizing plate 60R, 60G and 60B and do not return back to the liquid crystal panel, because they are converted into linearly polarized light beams whose optical polarizing axis meets at right angles with the light transmission axis of the polarizing plate 60R ,60G and 60B.

Moreover, if the first and second phase plates are $\lambda/4$ plates, and if the first phase plate 70R, 70G, and 70B are disposed in the manner that the direction of their slow axes are off-aligned 45° with that of the light transmission axis of their corresponding first and second polarization plates, the light beams which inject into the light composite system 11, as well as those which reflected on the light injecting surface of the light composite system 11 and return back to the polarizing plates 60R, 60G, and 60B are completely linearly polarized. Therefore, a liquid crystal display device which prevents a device from errors in function and has good color repeatability that enables high contrast. Also, if the first and second phase plates are disposed in the manner that the direction of their slow axes are off-aligned by 90°, the polarizing direction of the light beams injecting into the optical compositor 11 is same as that of the optical transmission axis of the polarizing plates 60R, 60G and 60B.

Reference is now made to FIGS. 5 and 6, depicting the third embodiment of the present invention. Here, The white light beam emitted from the light source 10 is separated into a P-polarized component and an S-polarized component, by means of the optical separator system 161 serving as an optical polarizing beam splitter. The P-polarized light beam is impinged into the brilliance modulation optical system 31 conducted by the mirror 174 and modulated in the brilliance liquid crystal panel according to a received brilliance signal. Then it passes through the polarizing plate 61, the first phase plate 71, and the second phase plate 82 in order, and is modulated into a linearly polarized light beam based on the action described hereinabove with reference to FIG. 1, then emitted to the optical brilliance combiner system 161.

More specifically, brilliance optical modulating system 31 comprises polarizing plate 41, the brilliance liquid crystal panel 51, and the polarizing plate 61. The first phase plate 71 is disposed optically stuck or adhered with the polarizing plate 61 in the output side of the brilliance modulating optical system 31. A single-axis ductile film having $\lambda/4$ optical characteristics is applied in a known manner for the first phase plate, which is disposed in the manner that the direction of slow axis of the first phase plate 71 is off-aligned 45° with that of the light transmission axis of the second polarizing plate 61. The second phase plate 81 is disposed from the output side of the first phase plate 71 and is also formed from a single-axis ductile film having $\lambda/4$ optical characteristics. Additionally, the second phase plate 81 is preferably disposed such that the direction of its slow axis is off-aligned by 90 degrees with that of the first phase plate 71.

On the other hand, the S-polarized light beam component emanating from light source 10 is, as discussed previously with respect to the to second embodiment described hereinabove with reference to FIG. 4, is separated into the three primary colors by means of the color separator system 100, conducted by the reflective mirrors 171, 172, and 173, as necessary, impinged into one of the optical modulating systems 30R, 30G, and 30B, and modulated in the color liquid crystal panels 50R, 50G, and 50B according to the video signal. Then it passes through the second polarizing plate 60R, 60G and 60B, the first phase plate 70R, 70G, and 70B, and the second phase plate 80R, 80G, and 80B in order, and is modulated into a composite linearly polarized light beam based on the action described above using FIGS. 1 and 4. This S component linearly polarized composite light beam is then emitted to the optical separator system 162 which is a optical polarizing beam combiner.

The P-polarized light beam serving as the brilliance signal and the S-polarized light beam are each impinged into the optical separator system 162 are compounded and emitted to the optical projector system 20. Also, the light beams reflected by interfaces between output side of the first phase plate 70R, 70G ,70B or 71 or input side of the second phase plates 80R, 80G , 80B or 81 and air return through the output side of the corresponding first phase plate 7R, 7G, 7B and 71. Then, the light beam(s) which is reflected by these interfaces are absorbed by the polarizing plate 60R, 60G, 60B and 61 and do not return back to the liquid crystal panel, because they is converted into the linearly polarized light beam whose optical polarizing axis meets at right angles with that of the light transmission axis of the polarizing plate 60R, 60G, 60B and 61.

Referring to FIG. 6, this figure presents an alternative physical arrangement of the third embodiment of the present invention previously discussed. Unlike FIG. 5, however, a different form of S and P component polarizing beam splitter 200 is used to separate and direct the P and S-polarizing component of the light beam emanating from light source 10. Nevertheless, optical modulation and composition remain the same as discussed previously, so further explanation of the components or optical action is omitted here.

FIG. 7 shows a optical system of the projector-type display device with two LCD modulating panels. The optical separator system 161, which is a optical polarizing beam splitter by which a light beam is separated into P and S-polarized light beams, is disposed over the way of a light beam emitted from the light source 10. The mirror 76 is disposed over the way of the P-polarized light beam to conduct the P-polarized light beam to the optical modulating system 31. The optical modulating system 31 comprises the first polarizing plate 41, the brilliance liquid crystal panel 51, and the second polarizing plate 61. The first phase plate 71 is disposed optically stuck or adhered with the polarizing plate 61 in the output side of the brilliance modulating optical system 31. A single-axis ductile film having $\lambda/4$ optical characteristics is applied for the first phase plate, which is disposed in the manner that the direction of slow axis of the first phase plate is off-aligned by 45° with respect to the light transmission axis of the second polarizing plate 61. The second phase plate 81 is disposed in the output side of the first phase plate 71. A single-axis ductile film having λ/4 optical characteristics is applied as well for the second phase plate 81, and is disposed such that the direction of its slow axis is off-aligned by 90° with that of the first phase plate 71. The modulating composite system 162, which is an optical polarizing beam combiner, is disposed in the output side of the second phase plate 81.

Mirror 175 is disposed over the way of the S-polarized light beam to conduct the S-polarized light beam to the color modulating system 32. The color modulating system 32 comprises the polarizing plate 42, the liquid crystal panel 52, and the polarizing plate 62. The polarizing plate 62 is disposed so that the direction of its light transmission axis is same as that of the S-polarized light beam. The first phase plate 72 is disposed optically stuck or adhered with the polarizing plate 62 in the output side of the color modulating system 32. Again, a single-axis ductile film having λ/4 optical characteristics is applied for the first and second phase plates 72 and 82. The first phase plate is aligned such that the direction of its slow axis is off-aligned 45° with that of the light transmission axis of the second polarizing plate 62. The second phase plate 82 is disposed in the output side of the first phase plate 72, and is aligned such that the direction of its slow axis is off-aligned 90° with respect to the light transmission axis of the first phase plate 72. The modulating composite system 162, which is a optical polarizing beam combiner, is disposed in the output side of the second phase plate 82. The optical projector system 20 is disposed in the output side of the modulating composite system 162 to project the resultant image onto screen 90.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A projection display, comprising:
   a light source,
   an optical modulation system for modulating a light beam emitted from said light source according to a signal, comprising:
      a liquid crystal panel for receiving and modulating the light beam in response to the signal to emit a modulated light beam through an output side thereof;
      a polarizer optically aligned with the output side of said liquid crystal panel for linearly polarizing the modulated light beam emitted from said liquid crystal panel;
   a first phase plate aligned with an output side of said polarizer for converting the linearly polarized, modulated light beam into a circularly polarized light beam;
   a second phase plate aligned with an output side of the first phase plate, with no optical components disposed therebetween, for directly converting the circularly polarized light beam into a linearly polarized light beam; and
   an optical projector system for projecting in enlarged fashion the linearly polarized light beam emitted by said second phase plate.

2. The projection display of claim 1, wherein each of said first and second phase plates comprise a λ/4 optical material having respective slow and fast optical axes.

3. The projection display of claim 2, wherein
   the polarizer defines a light transmission axis; and
   wherein the slow optical axis of said first phase plate is off-aligned 45° with respect to the light transmission axis of said polarizer.

4. The projection display of claim 3, wherein the slow optical axis of said second phase plate is off-aligned 90° with respect to the slow optical axis of said first phase plate.

5. A projection display, comprising:
   a light source for emitting a composite light beam;
   a color separator system in communication with said light source for receiving and separating the emitted composite light beam into a plurality of primary color light beams;
   an optical modulation system in communication with said color separator system for modulating each of the primary color light beams, comprising:
      a plurality of liquid crystal panels, each for receiving and modulating a corresponding one of the primary color light beams in response to a signal to emit a corresponding modulated primary color light beam through an output side thereof; and
      a plurality of polarizers, each optically aligned with the output side of a corresponding one of said liquid crystal panels, and each for linearly polarizing the corresponding modulated primary color light beam emitted from the corresponding one of said liquid crystal panels;
   at least one first phase plate aligned with an output side of a corresponding one of the plurality of polarizers for converting one of the linearly polarized, modulated primary color light beams into a corresponding circularly polarized primary color light beam;
   at least one second phase plate aligned with an output side of the at least one first phase plate for converting the corresponding circularly polarized primary color light beam into a corresponding linearly polarized primary color light beam;
   an optical compositing system in communication with said at least one second phase plate for compositing each of the linearly polarized primary color light beams received by said optical compositing system and emitting a linearly polarized, composited light beam in response thereto; and
   an optical projector system in communication with said optical compositing system for projecting in enlarged fashion the linearly polarized, composited light beam.

6. The projection display of claim 5, wherein each of said at least one first and second phase plates comprise a λ/4 optical material having respective slow and fast optical axes.

7. The projection display of claim 6, wherein
   each of the polarizers defines a light transmission axis; and
   wherein the slow optical axis of said at least one first phase plate is off-aligned 45° with respect to the light transmission axis of said corresponding polarizing plate.

8. The projection display of claim 7, wherein the slow optical axis of said at least one second phase plate is off-aligned 90° with respect to the slow axis of said at least one first phase plate.

9. The projection display of claim 5, wherein said optical modulation system, said at least one first phase plate, and the at least one second phase plate are disposed such that each linearly polarized primary color light beam passing through said at least one second phase plate is polarized in a common direction.

10. The projection display of claim 9, wherein the common direction of polarization is S-polarized with respect to the optical compositing system.

11. The projection display of claim 5, wherein
said optical modulation system comprises a distinct optical modulator including said plurality of polarizers, one for each primary color light beam, separated by said color separator system, a plurality of first phase plates, one for each primary color light beam, and a plurality of second phase plates, one for each primary color light beam;
wherein each of said first phase plates is disposed on an output side of a corresponding one of said polarizers; and
wherein each of said second phase plates is disposed on an output side of a corresponding one of said first phase plates.

12. The projection display of claim 5, wherein
said optical modulation system comprises a distinct optical modulator including said plurality of polarizers, one for each primary color light beam, separated by said color separator system; and
wherein said at least one first phase plate is aligned with the output side of the polarizer corresponding to a blue light beam.

13. The projection display of claim 12, wherein both the at least one first and the second phase plates are optically optimized for the blue color light beam.

14. The projection display of claim 5, wherein said optical compositing system comprises a prism compositor.

15. A projector-type display device comprising:
a light source,
an optical separator system for separating a white light beam emitted from the light source into a p-polarized light beam and an s-polarized light beam,
a color separator system for separating one of the p-polarized light beam and the s-polarized light beam into the three primary color beams,
a brilliance modulation optical system for modulating the other of the p-polarized light beam and the s-polarized light beam according to a brilliance signal using a brilliance liquid crystal panel having a polarizing plate on the output surface of thereof,
a chrominance modulation optical system for modulating each light beam separated by the color separation system according to each chrominance signal using a color liquid crystal panel having a polarizing plate on the output surface of thereof,
a first phase plate provided on the output side of the polarizing plate for converting the linearly polarized light beam that has passed through the optical modulation system into a circularly polarized light beam,
a second phase plate provided on the output side of the first phase plate for converting the circularly polarized light beam that has passed through the first phase plate into a linearly polarized light beam,
a color compositing system for compositing the color light beams that have passed through the second phase plate, and
an optical projector system for projecting on a screen in enlarged fashion the modulated light beam composted by the color compositing system.

16. A projection display, comprising:
a light source for emitting a composite light beam;
a color separator system in communication with said light source for receiving and separating the emitted composite light beam into a plurality of primary color light beams;
an optical modulation system in communication with said color separator system for modulating each of the primary color light beams, comprising:
a plurality of liquid crystal panels, each for receiving and modulating a corresponding one of the primary color light beams in response to a signal to emit a corresponding modulated primary color light beam through an output side thereof; and
a plurality of polarizers, each optically aligned with the output side of a corresponding one of said liquid crystal panels, and each for linearly polarizing the corresponding modulated primary color light beam emitted from the corresponding one of said liquid crystal panels;
at least one phase plate aligned with an output side of a corresponding one of the plurality of polarizers for converting one of the linearly polarized, modulated primary color light beams into a corresponding circularly polarized primary color light beam and then into a corresponding linearly polarized primary color light beam;
an optical compositing system in communication with said at least one phase plate for compositing each of the linearly polarized primary color light beams received by said optical compositing system and emitting a linearly polarized, composited light beam in response thereto; and
an optical projector system in communication with said optical compositing system for projecting in enlarged fashion the linearly polarized, composited light beam.

17. The projection display of claim 16, wherein
said optical modulation system comprises a distinct optical modulator including said plurality of polarizers, one for each primary color light beam, separated by said color separator system and a plurality of phase plates, one for each primary color light beam; and
wherein each of said phase plates is disposed on an output surface of a corresponding one of said polarizing plates.

18. The projection display of claim 16, wherein
said optical modulation system comprises a distinct optical modulator including said plurality of polarizers, one for each primary color light beam, separated by said color separator system; and
wherein said at least one phase plate is aligned with the output side of the polarizer corresponding to a blue light beam.

* * * * *